United States Patent [19]

Sussmeier

[11] Patent Number: 5,491,346
[45] Date of Patent: Feb. 13, 1996

[54] ANAMORPHIC LENS SYSTEM FOR A HAND-HELD SYMBOLOGY READER

[75] Inventor: John W. Sussmeier, Wappingers Falls, N.Y.

[73] Assignee: United Parcel Service of America, Inc., Atlanta, Ga.

[21] Appl. No.: 327,970

[22] Filed: Oct. 24, 1994

[51] Int. Cl.⁶ .................................................. G06K 7/10
[52] U.S. Cl. ..................... 250/568; 359/668; 235/472
[58] Field of Search .................................. 250/566, 568, 250/235, 236, 216; 235/472, 462, 454; 359/668, 669, 670, 671

[56] References Cited

U.S. PATENT DOCUMENTS

| | | |
|---|---|---|
| 1,829,634 | 10/1931 | Chretien . |
| 4,734,566 | 3/1988 | Senda . |
| 5,010,241 | 4/1991 | Butterworth ........................... 235/462 |
| 5,196,683 | 3/1993 | Marom et al. ......................... 235/462 |
| 5,278,397 | 1/1994 | Barkan . |
| 5,280,161 | 1/1994 | Niwa . |
| 5,291,008 | 3/1994 | Havens . |
| 5,354,977 | 10/1994 | Roustaei . |

Primary Examiner—Edward P. Westin
Assistant Examiner—Stephen Calogero
Attorney, Agent, or Firm—Jones & Askew

[57] ABSTRACT

A portable symbology reader utilizing an anamorphic lens system. The anamorphic lens system allows a low cost, high volume CCD sensor to be used in a hand-held, point and shoot, portable imaging system. The anamorphic lens system provides vertical sensor resolution equal to the horizontal while providing a maximum field of view.

20 Claims, 2 Drawing Sheets

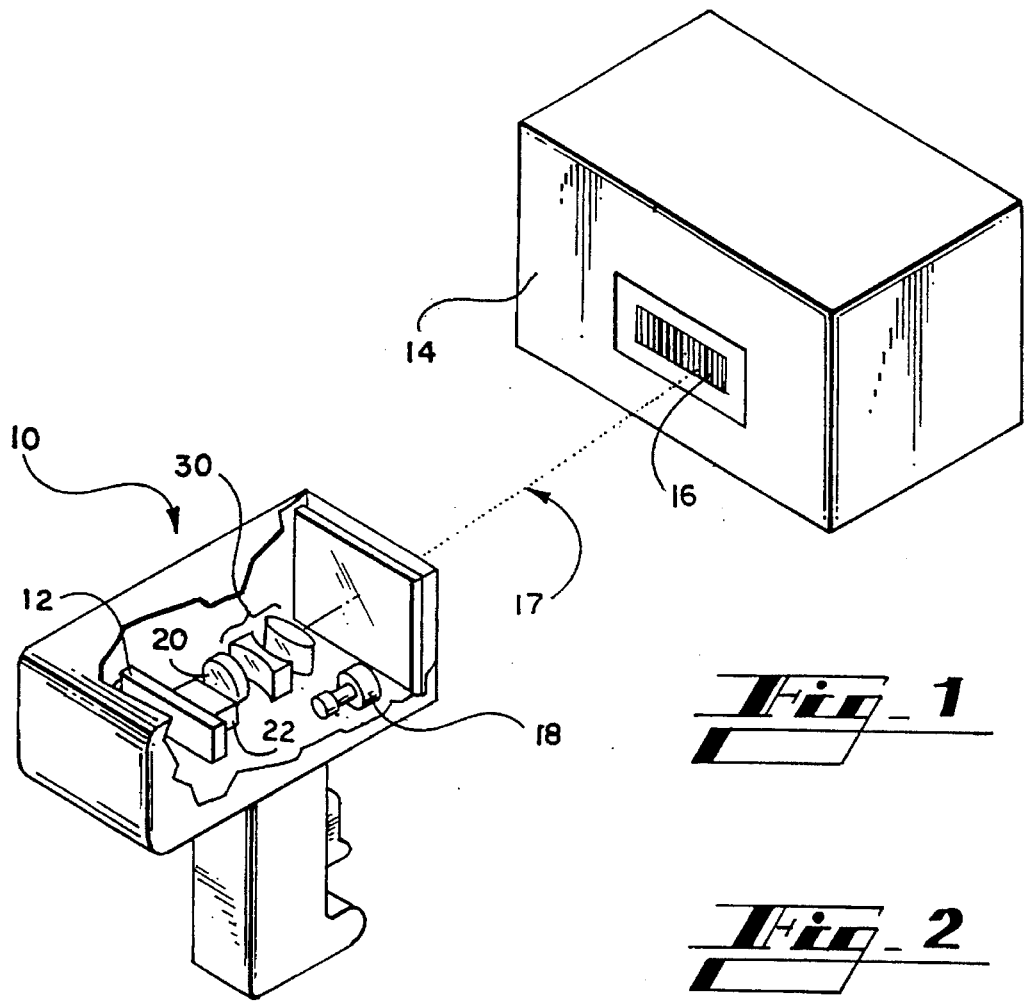
Fig_1
Fig_2
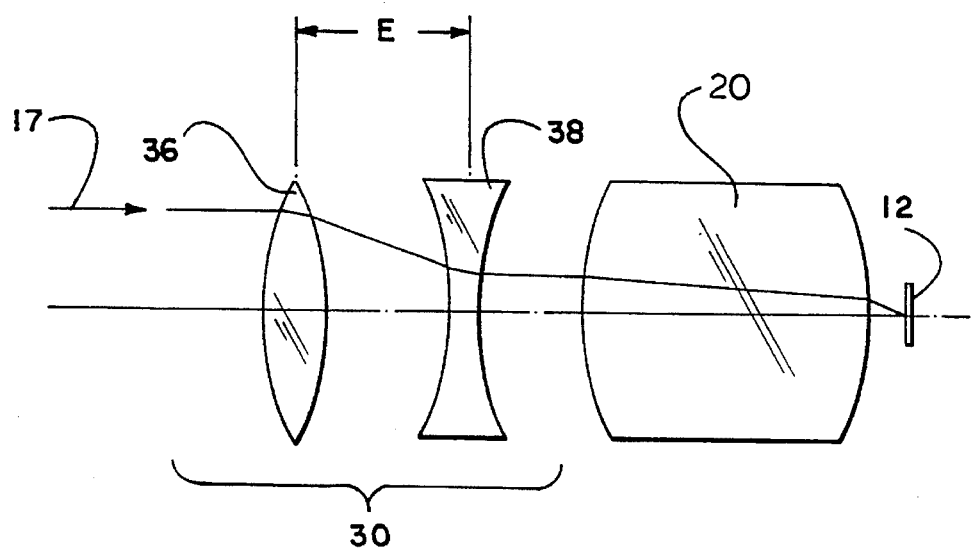

5,491,346

ANAMORPHIC LENS SYSTEM FOR A HAND-HELD SYMBOLOGY READER

TECHNICAL FIELD OF THE INVENTION

This invention is directed to a hand-held symbology reader, and more specifically is directed to an anamorphic lens system for a symbology reader.

BACKGROUND OF THE INVENTION

Most modern optical scanners and bar code readers ("symbology readers") employ optical systems to direct reflected light from the indicia being read onto an image sensor. Today, multi-element charge coupled device (CCD) arrays may be used as the image sensor, and, with such an array, a bar code symbol can be read while maintaining the reader in a stationary position, or by moving the indicia with respect to the reader, such as in an over-the-belt reader.

Often, because of the demands of an application, a portable point and shoot reader is desirable. However, accurate, portable symbology readers are relatively new and very expensive.

The evolution of the hand-held video camera, or "camcorder", has made available relatively inexpensive (around $100/unit) hand-held two-dimensional array CCD sensor technology. However, as is described below, the CCDs supplied in camcorders do not have adequate resolution to read the more complex symbology in the short exposure times needed for bar code readings, and therefore have not been utilized as symbology readers. This problem is largely due to the way the CCD in the camcorder works and the extremely short time frame in which a symbology needs to be read.

Typically, a spherical lens is used to focus rays reflected from an object onto the CCD. The CCD separates the image to a defined number of parts, called "pixels", which can be thought of as small dots on the CCD which extend in horizontal columns and vertical rows across the CCD. The number of pixels along each direction is referred to as the "sensor resolution" along that direction.

Because spherical lenses compress images of items equally in all directions, the representation of the object on the CCD is a scaled representation of the object. Thus, each pixel represents part of the object of a certain size, and conversely each inch of the object occupies a certain number of pixels in the image, depending on the sensor resolution, the compression of the spherical lens and the distance of the object from the lens. This number of pixels ("dots") per inch of the object is referred to as the "object resolution". The CCD may thus be said to project from the object through the optical system (the spherical lens) a certain object resolution defined by the sensor resolution, the lens characteristics, and the distance of the object from the camera lens. The maximum object size in a given meridian at a particular objection resolution is then determined by multiplying the number of pixels (on the CCD) in that meridian by the object resolution in that meridian (assuming the spherical lens fills the entire CCD).

Typically, a camcorder produces an interlaced video signal having two separate fields. Each field consists of alternating two row scanning, with the rows of pixels in each field aligned in the horizontal direction. Therefore, when viewing the CCD in terms of sensor resolution, each field can be considered to be represented by every other horizontal row of pixels. The fields typically have an exposure time of $\frac{1}{60}$ second, which effectively provides a complete new set of pixels for both fields every $\frac{1}{30}$ second (the standard IA video frame rate).

Tests have shown that for a point and shoot application, shutter speeds on the order of $\frac{1}{250}$ second are required to provide the necessary image freezing for reliable decoding performance in a symbology reader. Because this time frame is far less than the time it takes a camcorder CCD to replace the sets of pixels in both fields, only one field of video signal information can be captured when the shutter is opened. This effectively halves the vertical sensor resolution of the CCD, because an entire field of pixels, making up every other horizontal row, is not used.

Camcorders CCD's have moderate sensor resolution, typically having 768 pixels in the horizontal direction and 494 pixels in the vertical direction. Thus, in accordance with the description above, the sensor resolution for a typical camcorder CCD at a shutter speed necessary for image freezing is 768 pixels in the horizontal direction by 247 pixels in the vertical direction (494/2=247). As can be understood from the description below, the limitation on vertical sensor resolution can limit the horizontal object size to an insufficient amount for reading most bar codes. In addition, when two-dimensional symbols are to be read, it is preferred that vertical object resolution be equal to the horizontal. Without a drastic physical aspect ratio, the above-described discrepancy between the vertical and horizontal resolutions of the sensor makes the object resolution in the two meridians far from the same.

Many bar codes require about 100 dots per inch (dpi) of object resolution in both the vertical and horizontal fields for consistently successful decoding. As described above, the vertical resolution of the sensor is often the limiting factor on both horizontal and vertical maximum object size at a required object resolution. Thus, the horizontal object resolution can be determined assuming 100 dpi vertical object resolution. With the vertical object resolution fixed at this value, the horizontal and vertical object size and horizontal object resolution provided by the typical camcorder CCD at a predetermined length from the camera can be calculated as follows (assuming industry standard of a CCD sensor with a physical aspect ratio of horizontal to vertical of $\frac{4}{3}$):

Vertical object size=247 pixels/100 dpi=2.47 inches

Horizontal object size=2.47 inches×$\frac{4}{3}$=3.29 inches

Horizontal object resolution=768 pixels/3.29 in.=233 dpi

The 3.29 inches of horizontal object size is generally unacceptable for industry standards, even if a user points and shoots the reader accurately and hits the bar code perfectly with each attempt. If a reasonable border is allowed around the label for human point and shoot tolerance, the horizontal object size would need to be expanded even more. In addition, the horizontal object resolution of 233 dpi set forth above is excessive and not required. Preferably, for a two-dimensional symbology reading, the horizontal object resolution would be equal to the vertical.

One way to increase the horizontal object size is to use a progressive scanning sensor which doubles the vertical resolution and therefore doubles the horizontal and vertical object size. These cameras are very expensive and currently are only available in prototype form. There is a need for an inexpensive system which can adapt a typical camcorder CCD to accommodate the needed horizontal object size and correct for the discrepancies between horizontal and vertical sensor resolution.

SUMMARY OF THE INVENTION

The present invention solves the above problems by providing an anamorphic lens system for use in a hand-held, point and shoot, portable symbology reader. The imaging system is capable of reading one and two-dimensional symbols while using a low cost, high volume CCD sensor. The lens system provides a vertical object resolution equal to the horizontal while providing the maximum field of view.

More specifically described, the present invention provides a symbology reader for detecting a coded symbol on an object, the coded symbol requiring at least a first predetermined object resolution along a vertical plane. The reader includes a two-dimensional array CCD sensor, the CCD sensor defining a horizontal sensor resolution and a vertical sensor resolution, the horizontal sensor resolution being greater than the vertical sensor resolution. An optical system is designed to focus rays from the symbol onto the CCD sensor. The CCD sensor and the optical system are configured such that when the reader is positioned within a predetermined range of distance from the object, the CCD sensor projects from the symbol through the optical system (1) a vertical object resolution no less than the first predetermined vertical object resolution, (2) a horizontal object resolution, and (3) a horizontal object size. An anamorphic lens system is included in the symbology reader interposed between the CCD sensor and the symbol, and is designed to increase the horizontal object size projected to the CCD sensor and thereby decrease the horizontal object resolution, while maintaining the vertical object resolution at no less than the first predetermined vertical object resolution.

The symbology reader may be configured such that the horizontal object size is increased to a degree by the anamorphic lens system such that the horizontal object resolution is equal to the vertical object resolution. In addition, the anamorphic lens may be interposed in a position between the optical system and the symbology when the symbology is being read.

The horizontal sensor resolution of the CCD sensor may be much greater than the vertical sensor resolution of the CCD sensor because of the limited exposure time allowed for consistently accurate reading of the symbol. When the exposure controller is set for an exposure time which is no greater than the exposure time allowed for a symbol, the CCD sensor may use only one field and the vertical sensor resolution is halved. In such a case, the horizontal sensor resolution of the CCD sensor could be at least twice the vertical resolution of the CCD sensor. The addition of an anamorphic lens to the symbology reader, as taught by the present invention, resolves the inequality of vertical and horizontal sensor resolutions by increasing the horizontal object size projected to the CCD sensor, and thereby decreasing horizontal object resolution.

Preferably, the anamorphic lens system comprises a convex cylindrical lens and a concave cylindrical lens. A combination of the convex and concave cylindrical lens which has been found to be advantageous includes a convex lens having a focal length approximately twice the absolute value of the focal length of the concave lens.

The present invention is also directed to a method of reading a coded symbol on an object with the reader having a two-dimensional array, two-.field CCD sensor, the coded symbol requiring at least a first predetermined object resolution along a vertical plane and requiring an exposure of no greater than a predetermined time. A first step in the method is exposing the CCD sensor to rays from the object through an optical system for an amount of time which is no greater than the predetermined time, causing only one field of the CCD sensor to be used such that a horizontal sensor resolution of the CCD sensor is greater than the vertical sensor resolution and such that the CCD sensor projects from the symbology through the optical system when the object is within the predetermined range of distance from the reader a vertical object resolution no less than the first predetermined vertical object resolution, a horizontal object resolution, and a horizontal object size. The final step is increasing the horizontal object size projected by the CCD sensor with an anamorphic lens system such that the horizontal object resolution is decreased while maintaining the vertical object resolution at no less than the predetermined object resolution.

Therefore, it is an object of present invention to provide a low cost, hand-held symbology reader.

A further object of the present invention is to provide a lens system for a symbology reader in which the vertical object resolution is equal to the horizontal while providing a maximum field of view.

Still another object of the present invention is to provide means for using a lost cost, high volume CCD sensor in a hand-held, point and shoot, portable imaging system capable of reading one or two-dimensional symbols.

Further objects, features and advantages will become apparent upon consideration of the following detailed description of the invention when taken in conjunction with the drawing and the appended claims.

BRIEF DESCRIPTION OF THE DRAWING

FIG. 1 sets forth symbology reader embodying the present invention, the symbology reader shown as reading an object.

FIG. 2 is a top view of an anamorphic lens system along with the spherical lens for use in the symbology reader of FIG. 1.

DESCRIPTION OF PREFERRED EMBODIMENT

Figure 3:
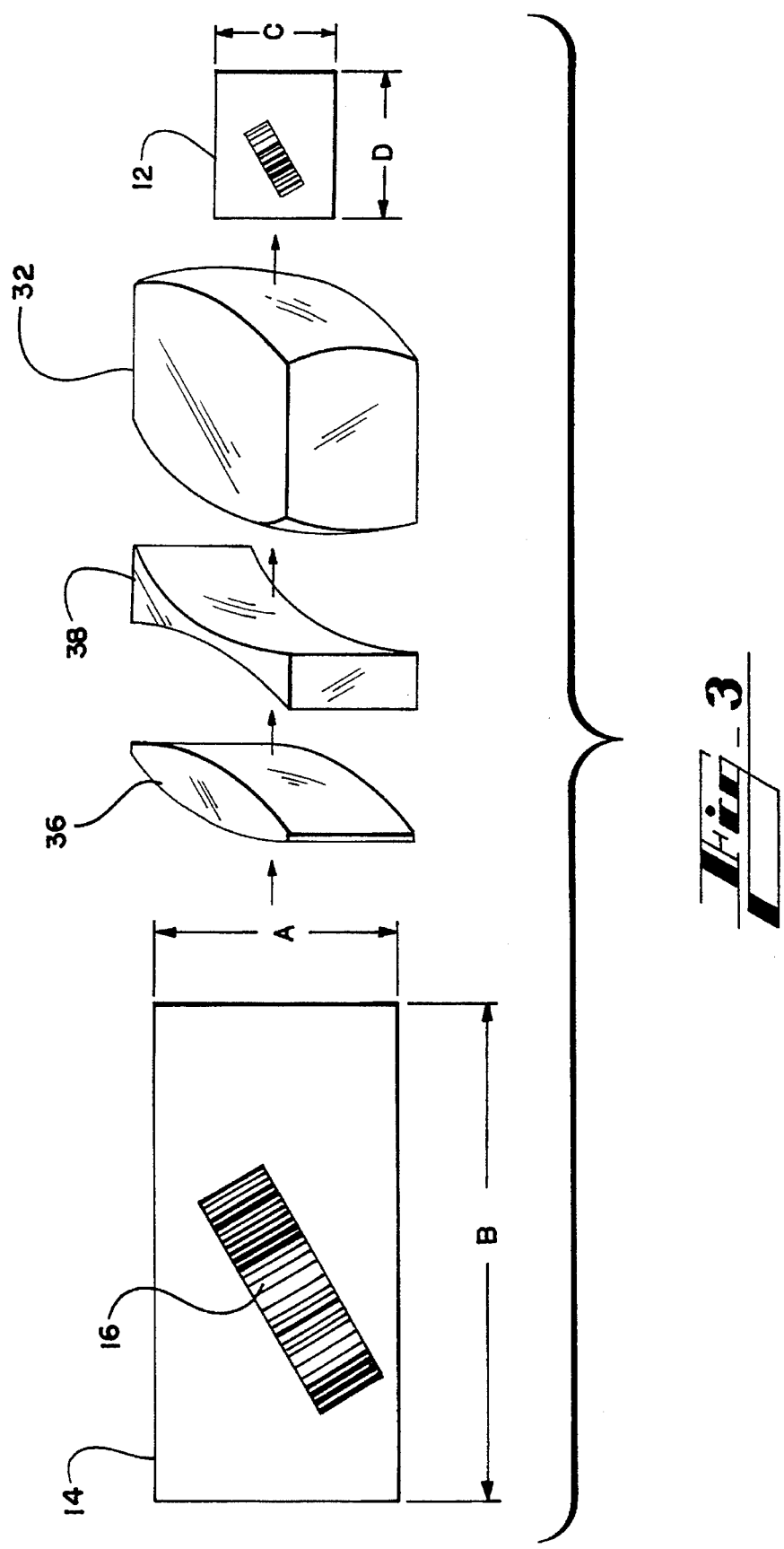
FIG. 3 sets forth object to image mapping of the symbology reader of FIG. 1.

Turning now to the drawing, FIG. 1 sets forth a symbology reader 10, which includes a charge coupled device (CCD) 12 such as is found in a typical camcorder. In the use of such a reader 10, an object 14 provided with a bar code symbol 16 is illuminated by a light source such as a light emitting diode 18 so that the bar code reflects high luminance red light. Reflected light rays 17 from the bar code 16 are focused by an optical system, typically a spherical lens 20, onto the charge coupled device 12. The amount that the light rays expose the CCD 12 is regulated by an exposure controller 22, such as a mechanical or electronic shutter, as is known in the industry. In the present invention, an anamorphic lens system 30, shown from above in FIG. 2, compresses in the horizontal dimension the rays 17 reflected from the object 14 onto the CCD 12. The anamorphic lens system 30 is preferably contained within the end of the symbology reader 10 next to the spherical lens 20.

The anamorphic lens system 30 set forth in FIG. 2 consists of a Galilean telescope composed of a cylindrical, convex, convergent lens 36 and a cylindrical, concave, divergent lens 38. The two cylindrical lenses 36, 38 are preferably spaced apart between their principal planes by a distance (designated by E in FIG. 2) which is equal to the sum of the focal lengths of the two lenses. Preferably, the anamorphic lens system 30 includes cylindrical lenses 36, 38 with the focal length of the concave lens 38 being approximately twice the positive value for the focal length of the convex lens 36. A lens system which has been found to work particularly well includes a convex lens 36 with a focal length of 25 mm, a concave lens 38 with a focal length of −12.7 mm (the focal length of a concave lens is always a negative number), and a spherical lens 20 with a focal length of 7.5 mm. In accordance with the description above, the distance E would be 25+(−12.7)=12.3 mm. The concave lens 38 is preferably placed as close as possible to the spherical lens 20 so that the size of the convex lens 36 may be minimized.

The principle of the anamorphic lens system 30 is that the system has a different magnification in one principal meridian than in the other. The two lenses 36, 38 compress the focal length of the spherical lens 34 and thus widen its field of view along one meridian (the horizontal), and essentially do not affect the focal length or field of view along the other meridian (the vertical). An anamorphic lens system is set forth in U.S. Pat. No 1,829,634, which discloses the use of an anamorphic lens system in a motion picture camera.

The use of the anamorphic lens system 30 in the symbology reader 10 of the present invention allows the vertical object resolution to be equal to the horizontal, while providing a maximum horizontal field of view. FIG. 3 sets forth object-to-image mapping by the present anamorphic lens system 30 of a bar code 16 onto the CCD 12. The mapping is not shown to scale, but represents diagramatically the compression of the horizontal field of view of the object. By using the anamorphic lens system 30, the object 14 which is read may have a field of view in which the physical aspect ratio is much greater than the physical aspect ratio of the CCD 12.

The advantages of the anamorphic lens system 30 may be further understood by reference to an example. As set forth in the background section of this disclosure, a typical symbology reader 10 (not utilizing an anamorphic lens system) suitable for use in an application requiring a vertical object resolution of 100 dpi might have a vertical object size of 2.47 inches, a horizontal object size of 3.29 inches, and a horizontal object resolution of 233 dpi. The limited size of the vertical and horizontal fields of view, and therefore the object size, is dictated by the limited sensor resolution, which in turn is halved along the vertical meridian by the short exposure times required for imaging symbols, as explained above.

The specific values given for object resolutions and object sizes are calculated with the symbology reader 10 being a predetermined distance from the object. The predetermined distance represents the maximum distance between the object and the symbology reader 10 in which the symbology reader 10 described has an adequate vertical object resolution of 100 dpi. The range of distances in which the symbology reader 10 and the object are an appropriate distance apart such that the vertical object resolution is adequate is hereinafter referred to as the "predetermined range of distance". It is to be understood that as the symbology reader 10 is positioned closer to the object, the vertical and horizontal object resolutions will increase, but the object sizes will also decrease along each meridian. If the distance between the symbology reader 10 and the object decreases too much, then the vertical and horizontal object sizes will be inadequate to compensate for human point and shoot tolerances or to accommodate longer bar codes.

In the example given, the physical aspect ratio of the object being imaged without the anamorphic lens system 30 is equal to the physical aspect ratio of the CCD 12, or 4/3(3.29/2.47=4/3). By using the anamorphic lens system 30, the horizontal field of view of the same symbology reader 10 may be broadened to a point where horizontal object resolution is also equal to 100 dpi, which extends the horizontal object size as follows:

Vertical object size=247 pixels/100 dpi=2.47 inches

Horizontal object size=768 pixels/100 dpi=7.68 inches

As can be seen, the vertical object size (represented by A in FIG. 3) remains the same when the anamorphic lens system 30 is added, and the horizontal object size (represented by B in FIG. 3) increases to a length which allows for human point and shoot tolerances and an extra area around the bar code 16. Therefore, the symbology reader may read long bar codes at an acceptable object resolution. The physical aspect ratio of the object also increases to 3.11 (7.68/2.47). By using the anamorphic lens system 30, a larger object size in the horizontal dimension may be accommodated by the limited dimensions of the CCD. In addition, the inequality of the horizontal and vertical object resolutions is no longer a problem. Preferably, if the symbology reader 10 is to be used to read two-dimensional symbology, the horizontal field of view will be increased by an amount such that the horizontal object resolution will be equal to the vertical.

Different cylindrical lenses 36, 38 could be used in the anamorphic lens system 30 so as to allow varying dimensions for the horizontal object size, but preferably lenses are selected to increase the horizontal object size by an amount such that the horizontal object resolution will be equal to the vertical object resolution. The matching resolutions are significant in that two-dimensional symbols often require the same object resolution along each meridian.

As can be understood from the foregoing description, the symbology reader 10 of the present invention solves many of the problems of the prior art so that an inexpensive CCD made for a hand-held video camera may be used in a symbology reader. Specifically, the present invention addresses the problem of a CCD having a great difference in horizontal and vertical sensor resolutions, created by the need for a very short exposure time. A CCD with such a large discrepancy between the sensor resolutions in the two meridians presents an horizontal object size which is inadequate to accommodate most reader applications, and unequal horizontal and vertical object resolutions. The present invention solves this problem by providing an anamorphic lens system 30 which increases the horizontal object size while maintaining a maximum vertical object resolution. The anamorphic lens system 30 may be designed such that the horizontal object size is increased to a degree that the horizontal object resolution is equal to the vertical.

The terms "vertical" and "horizontal" have been used throughout this disclosure only in a relative sense to define a frame of reference. For example, although the references in the description refer to use of the anamorphic lens system to expand the field in the horizontal meridian, it is to be understood that this horizontal meridian may be defined along any plane so as to expand the field of view in a desired direction. Also, the anamorphic lens system 30 could be located between the spherical lens 20 and the CCD instead of on the opposite side of the spherical lens. However, an anamorphic lens system 30 located at this position in the optics would require very small cylindrical lenses 36, 38.

While this invention has been described in detail with particular reference to preferred embodiments thereof, it will be understood that variations and modifications can be effected within the spirit and scope of the invention as described herein and before as described in the appended claims.

The invention claimed is:

1. A symbology reader for detecting a coded symbol on an object, the coded symbol requiring at least a first predetermined object resolution along a vertical plane and requiring an exposure time of no greater than a predetermined time; the reader comprising:

a two-dimensional array, two-field CCD sensor, the CCD sensor defining a horizontal sensor resolution and a vertical sensor resolution;

an exposure controller configured for selectively adjusting an exposure time of the CCD sensor;

an optical system designed to focus rays from the symbol onto the CCD sensor;

the CCD sensor, the optical system, and the exposure controller being configured such that when the reader is positioned within a predetermined range of distance from the object, and the exposure controller is set for an exposure time of no greater than the predetermined time, the CCD sensor uses only one field and the vertical sensor resolution is halved such that the CCD sensor projects from the symbol through the optical system (1) a vertical object resolution no less than the first predetermined vertical object resolution, (2) a horizontal object resolution, and (3) a horizontal object size; and an anamorphic lens system interposed between the CCD sensor and the symbol, the anamorphic lens system designed to increase the horizontal object size projected to the CCD sensor and thereby decrease the horizontal object resolution while maintaining the vertical object resolution at no less than the first predetermined vertical object resolution.

2. The symbology reader of claim 1, wherein the horizontal object size is increased to a degree by the anamorphic lens system such that the horizontal object resolution is equal to the vertical object resolution.

3. The symbology reader of claim 1, wherein the anamorphic lens system is interposed in a position between the optical system and the symbol when the symbol is being read.

4. The symbology reader of claim 1, wherein the horizontal sensor resolution of the CCD sensor is at least twice the vertical sensor resolution of the CCD sensor when the CCD uses only one field.

5. The symbology reader of claim 1, wherein the optical system comprises a spherical lens.

6. The symbology reader of claim 1, wherein the first predetermined object resolution is 100 dpi.

7. The symbology reader of claim 1, wherein the horizontal sensor resolution is approximately 770 pixels and the vertical sensor resolution is approximately 250 pixels when the CCD uses only one field.

8. The symbology reader of claim 1, wherein the horizontal object size is at least doubled by the anamorphic lens system.

9. The symbology reader of claim 1, wherein the predetermined time is approximately 1/250 second.

10. The symbology reader of claim 1, wherein the anamorphic lens system comprises a convex cylindrical lens and a concave cylindrical lens.

11. The symbology reader of claim 10, wherein the focal length of the convex lens is approximately twice the absolute value of the focal length of the concave lens.

12. The symbology reader of claim 11, wherein the focal length of the concave cylindrical lens is approximately −12.7 mm and the focal length of the convex cylindrical lens is approximately 25 mm.

13. A method of reading a coded symbol on an object with a reader having a two-dimensional array CCD sensor, the coded symbol requiring at least a first predetermined object resolution along a vertical plane, comprising the steps of:

exposing the CCD sensor to rays from the object through an optical system such that a horizontal sensor resolution of the CCD sensor is greater than the vertical sensor resolution and such that the CCD sensor projects from the symbology through the optical system when the object is within a predetermined range of distance from the reader (1) a vertical object resolution no less than the first predetermined vertical object resolution, (2) a horizontal object resolution, and (3) a horizontal object size; and increasing the horizontal object size projected by the CCD sensor with an anamorphic lens system such that the horizontal object resolution is decreased while maintaining the vertical object resolution at no less than the predetermined object resolution.

14. The method of claim 13, wherein the horizontal object size is increased to a degree by the anamorphic lens system that the horizontal object resolution is equal to the vertical object resolution.

15. The method of claim 13, wherein the horizontal sensor resolution of the CCD sensor is at least twice the vertical sensor resolution of the CCD sensor.

16. The method of claim 13, wherein the first predetermined object resolution is 100 dpi.

17. The method of claim 13, wherein the horizontal sensor resolution is approximately 770 pixels and the vertical sensor resolution is approximately 250 pixels when the CCD uses only one field.

18. The method of claim 13, wherein the horizontal object size is at least doubled by the anamorphic lens system.

19. A symbology reader for detecting a coded symbol on an object, the coded symbol requiring at least a first predetermined object resolution along a vertical plane; the reader comprising:

a two-dimensional array CCD sensor, the CCD sensor defining a horizontal sensor resolution and a vertical sensor resolution, the horizontal sensor resolution being greater than the vertical sensor resolution;

an optical system designed to focus rays from the symbol onto the CCD sensor;

the CCD sensor and the optical system being configured such that when the reader is positioned within a predetermined range of distance from the object, the CCD sensor projects from the symbol through the optical system (1) a vertical object resolution no less than the first predetermined vertical object resolution, (2) a horizontal object resolution, and (3) a horizontal object size; and an anamorphic lens system configured to be interposed between the CCD sensor and the symbol, the anamorphic lens system designed to increase the horizontal object size projected to the CCD sensor and thereby decrease the horizontal object resolution while maintaining the vertical object resolution at no less than the first predetermined vertical object resolution.

20. The symbology reader of claim 19, wherein the horizontal object size is increased to a degree by the anamorphic lens system such that the horizontal object resolution is equal to the vertical object resolution.

* * * * *